(12) United States Patent
Milton et al.

(10) Patent No.: US 7,284,487 B2
(45) Date of Patent: Oct. 23, 2007

(54) SINGLE-PIECE STEREOLITHOGRAPHICALLY-PRODUCED MISSILE IGNITER

(75) Inventors: Robert W. Milton, New Market, AL (US); Mark W. Kirkham, Huntsville, AL (US); Robert S. Michaels, Scottsboro, AL (US); Jon A. Freeman, Huntsville, AL (US); Bryce D. Brubaker, Huntsville, AL (US)

(73) Assignee: United States of America as represented by the Secretary of the Army, Washington, DC (US)

( * ) Notice: Subject to any disclaimer, the term of this patent is extended or adjusted under 35 U.S.C. 154(b) by 504 days.

(21) Appl. No.: 10/885,525

(22) Filed: Jul. 6, 2004

(65) Prior Publication Data

US 2006/0005729 A1 Jan. 12, 2006

(51) Int. Cl.
*C06C 7/00* (2006.01)
(52) U.S. Cl. ......................................... 102/202; 60/256
(58) Field of Classification Search ................ 102/202; 60/256
See application file for complete search history.

(56) References Cited

U.S. PATENT DOCUMENTS

| | | | | |
|---|---|---|---|---|
| 2,776,623 | A | * | 1/1957 | Bonner ......................... 60/256 |
| 3,304,865 | A | * | 2/1967 | Gungle ................... 239/265.11 |
| 4,023,497 | A | * | 5/1977 | Morris et al. ................ 102/380 |
| 4,751,881 | A | | 6/1988 | Fauconnier et al. ......... 102/202 |
| 5,007,236 | A | | 4/1991 | Myers et al. .................. 60/256 |
| 5,062,206 | A | | 11/1991 | Myers et al. ............. 29/890.01 |

* cited by examiner

*Primary Examiner*—Michelle Clement
(74) *Attorney, Agent, or Firm*—Hay Kyung Chang

(57) ABSTRACT

Stereolithography is used to fabricate directly a single-piece, missile-usable, accurate, flightweight igniter without the use of intermediate, non-operational molds or prototypes in the fabrication process. The same prototype-less, direct stereolithography can be used to produce other missile-usable parts by designing each such part to be of a single-piece configuration and by using material that is suitable for both stereolithography and functional missile application.

2 Claims, 4 Drawing Sheets

SINGLE-PIECE STEREOLITHOGRAPHICALLY-PRODUCED MISSILE IGNITER

The invention described herein may be manufactured, used and licensed by or for the Government for governmental purposes without the payment to us of any royalties thereon.

BACKGROUND OF THE INVENTION

New functional parts to solve a particular problem are now frequently designed and modeled by rapid prototyping. This entails generating physical models directly from a 3-D computer drawing created with computer aided design software. The model design is then electronically transmitted to a rapid prototyping system. Stereolithography (SL) is such a system.

The stereolithography apparatus (SLA) consists of a vat of a liquid polymer in which there is a movable elevator table/platform that is capable of moving (i.e. lowering) in very precise increments, the increments depending on the requirements defining the type of model to be constructed. A helium/cadmium laser is then used to generate a small but intense beam of ultraviolet light that is moved across the top of the vat of liquid polymer by a computer-controlled optical scanning system. At the point where the laser beam meets the polymer, the polymer is changed into a solid. As the laser beam is directed across all surfaces of the three dimensions, the model is formed as a plastic object point by point and layer by layer. As each layer is formed, the elevator platform is lowered by the pre-determined increment, so that the next layer can be scanned in. As each additional layer is formed, it bonds to the previous one. What results is a model generated by a precise number of successive layers.

After the model is removed from the SLA, it is ultrasonically cleaned to remove any excess polymer from crevices and openings. Then the model undergoes a curing operation to finish hardening the polymer. The curing operation usually involves bathing the model in intense long-wave ultraviolet light which causes any uncured liquid polymer that may be trapped within the structure to harden. When the model is properly cured, the surface can be finished in a number of ways to meet the requirement.

Under the current practice, stereolithography process is used to produce a mold or other inoperative prototype which is then used as a master from which to fabricate functional parts using conventional casting or machining technology. The materials normally used to produce such master parts via SL process have special properties that render them suitable for SL but not for fully functional, flightweight parts, such as missile hardware.

An important piece of missile hardware is the igniter to boost the motor of the missile. Igniter 100 is normally positioned in throat 403 of nozzle 106 of missile 101, as illustrated in FIG. 1, and boosts motor 102 by directing burning pyrotechnics onto propellant fuel 104. Due to the limitations of conventional manufacturing processes and the complexity of removable missile igniters, typically such an igniter was made in several separate pieces that were then put together to form an assembly. In a conventional removable igniter, frangible fingers or tabs are used to hold the igniter secure in the missile nozzle until sufficient pressure builds inside the missile to eject the igniter. For the frangible tabs to work, a screw-in sleeve must be inserted into the throat of the igniter, thereby forcing the tabs into securing positions in nozzle throat 403. This technique is not desirable from a safety standpoint as it requires as least two parts of a fully loaded igniter to be rotated, screwed or otherwise moved, presenting a hazard of untimely ignition due to friction between moving parts, handling or electrostatic discharge.

SUMMARY OF THE INVENTION

Subject single-piece igniter is designed to be fabricated by stereolithography to result directly in a missile-usable, accurate, flightweight igniter without the use of intervening molds or prototypes in the fabrication process Flexible nozzle tabs greatly reduce the potential for pre-ignition. The same prototype-less, direct stereolithography can be used to produce other missile-usable parts by designing each such part to be of single piece configuration and by using suitable stereolithography material such as Somos® 9120 epoxy photopolymer, Somos® WaterClear™ 10120 epoxy photopolymer, Somos® 8110 epoxy photopolymer or RenShape® SL 5195 to comprise the part.

DESCRIPTION OF THE PREFERRED EMBODIMENT

Figure 1:
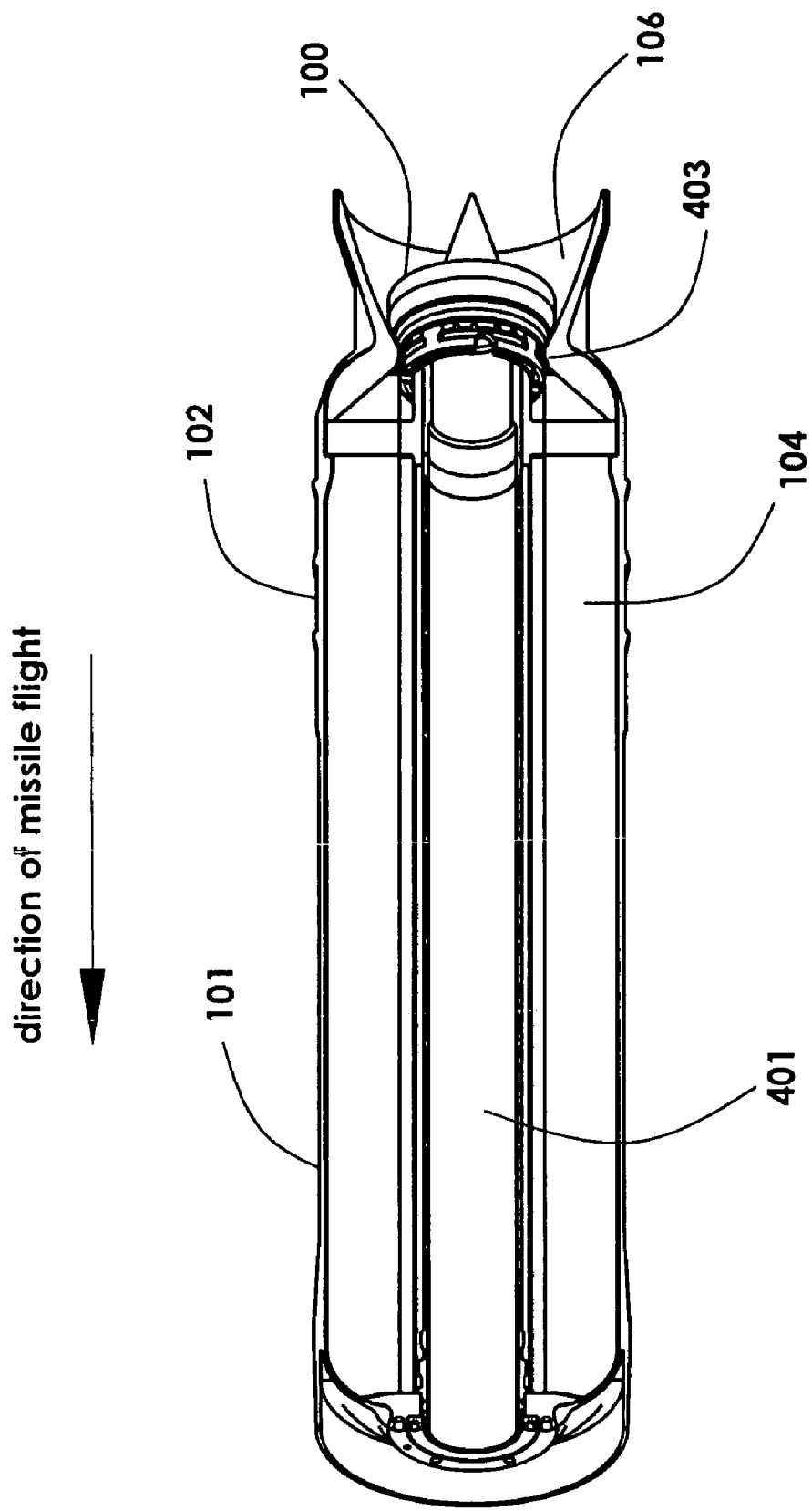
FIG. 1 illustrates the typical position of igniter 100 in missile 101 flying in the indicated direction.

Referring now to the drawing wherein like numbers represent like parts in each of the several figures, the structure of the single-piece, missile-usable igniter produced directly from stereolithography is explained in detail. As stated above, other missile-usable parts can be produced by applying the same steps that apply to the production of the igniter. Therefore, the method of stereolithographic production of the igniter is illustrative and not limiting.

The initial step is to identify the mechanical solution to the given problem. Then this solution is designed to be a single-piece hardware, allowing no separate or disassociated components, mechanical connector, fasteners or weldments to be a part of the usable hardware, regardless of how complex the hardware. Attachment points that facilitate the attachment of the stereolithographically-fabricated hardware part to another component or assembly may be comprised of conventional hard points such as threaded holes, pins, slots or flexible joints.

Upon completion of the design of the part, a material is selected and tested for suitability both for stereolithography process and the intended ultimate use of the designed part. These tests include stress, strain, flexibility, pressure and other operational conditions calculations reflecting brittle failure scenarios since the stereolithographic materials are plastic. Some materials found to be suitable for the dual purposes of stereolithographic fabrication and full-scale missile functionality are, in a descending order of desirability, Somos® 9120 epoxy photopolymer, Somos® 8110 epoxy photopolymer, Somos® WaterClear™ 10120 epoxy photopolymer, RenShape® SL 5195 and WaterShed™ 11120.

When the suitability of the selected material is verified, stereolithography is practiced on the material to produce the final, accurate, missile-usable part in accordance with the design.

Figure 2:
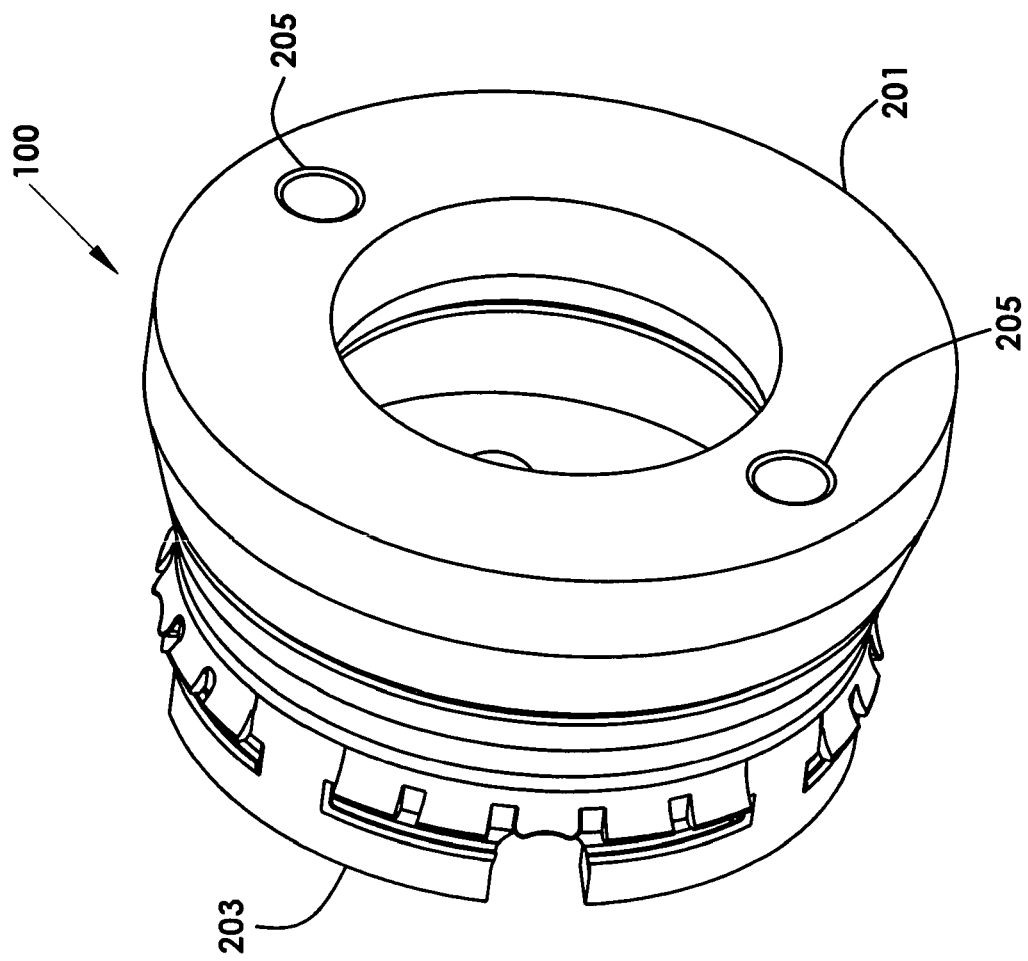
FIG. 2 depicts missile-usable igniter 100 that is fabricated directly from stereolithography.
Figure 3:
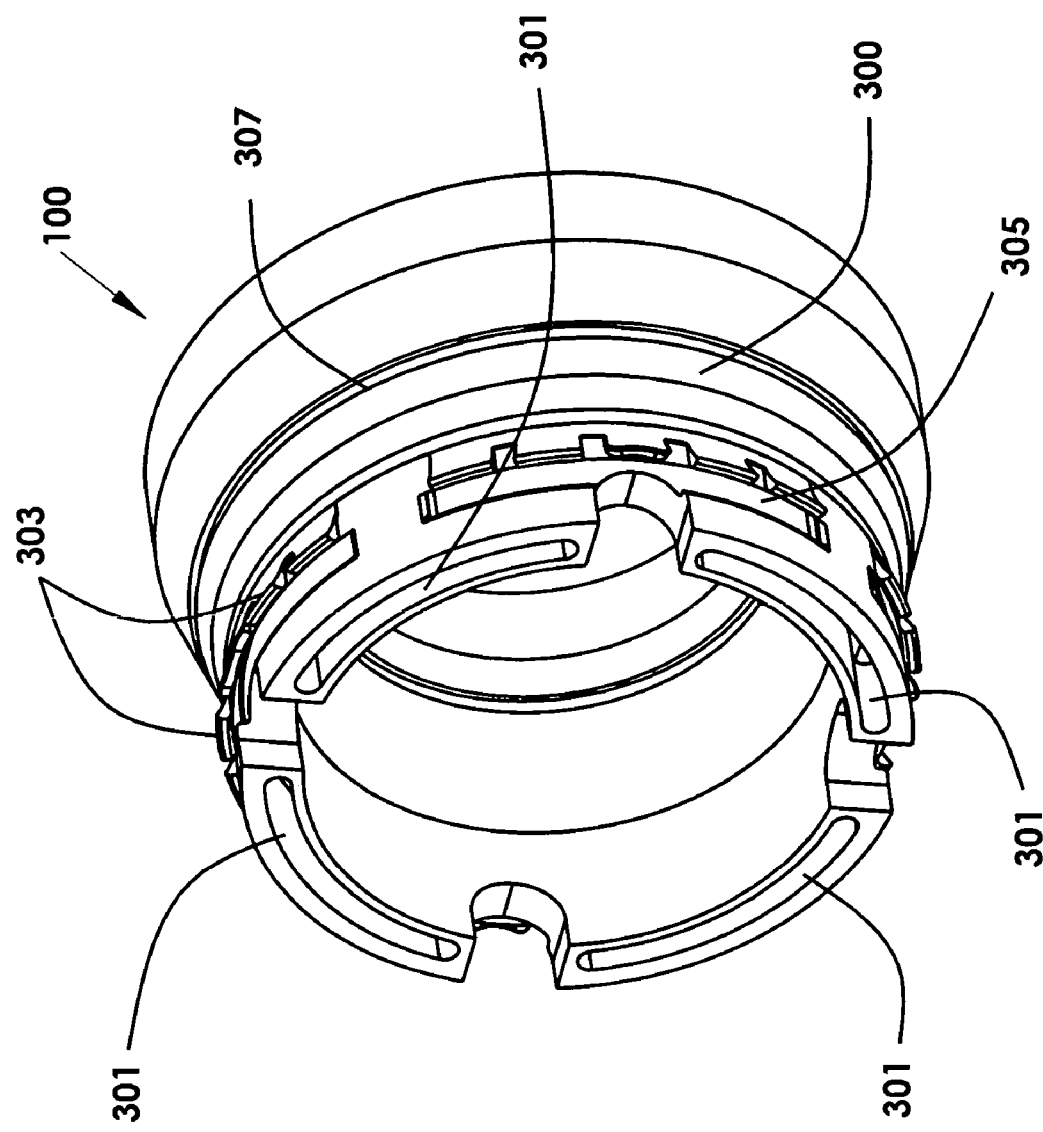
FIG. 3 shows the details of the various parts of the single-piece igniter.
Figure 4:
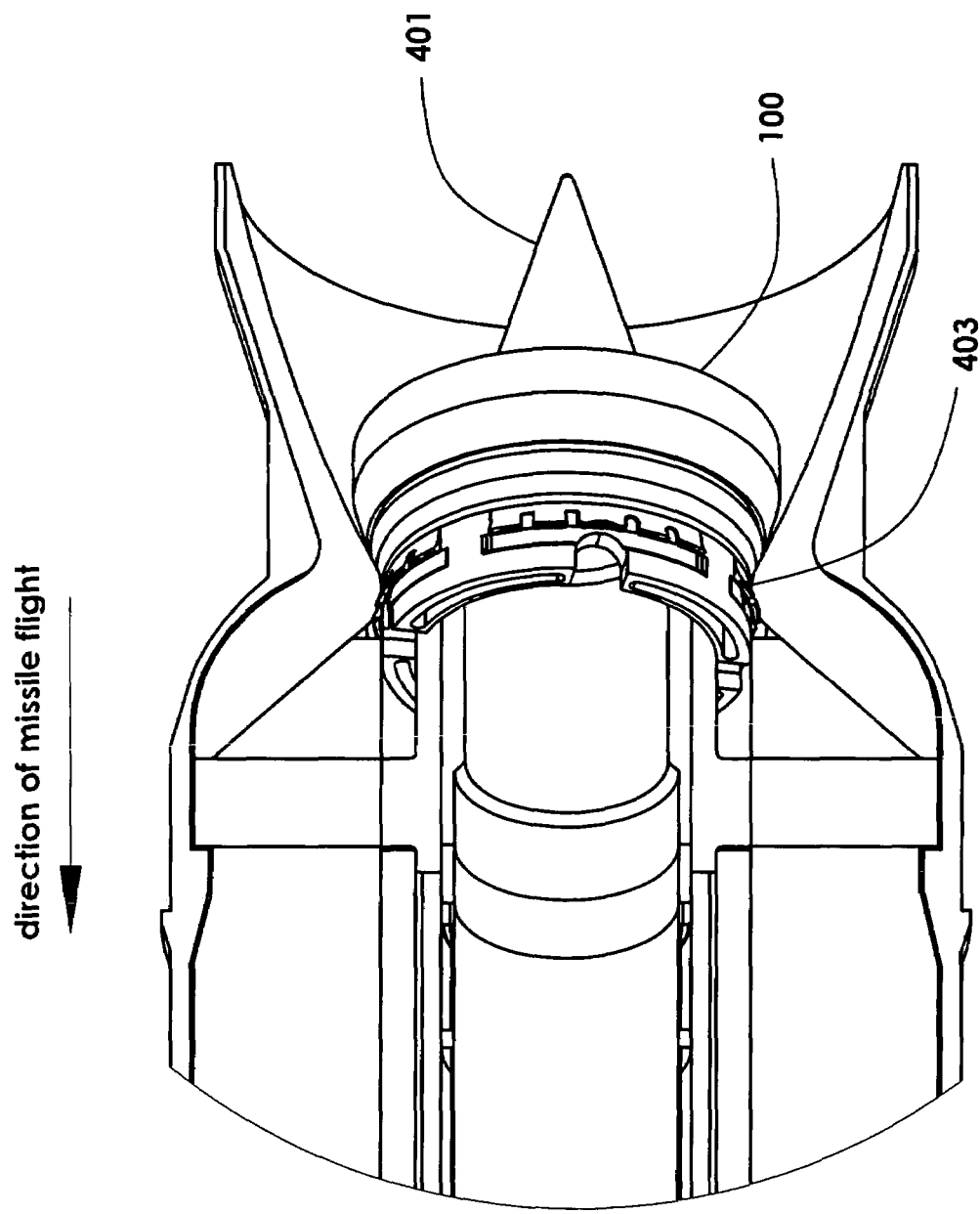
FIG. 4 is an enlarged view of the igniter position is the missile.

Using the above algorithm, igniter 100, usable in a missile such as compact kinetic energy missile (CKEM), is fabricated and is shown in FIG. 2. This igniter is annular in shape because it is designed to be mounted on penetrator 401 inside missile 101 at nozzle throat 403 (as shown in FIGS. 1 and 4). However, the annular shape is illustrative only, and the igniter may take any shape suitable for its intended use. The single-piece igniter has chamber 300 (also necessarily annular in this particular configuration of the igniter) that communicates with multiple initiator ports 205 located on back-facing end 201 (i.e. facing nozzle 106) and with multiple igniter output ports 301 located on front-facing end 203 (i.e. facing the fuel) of the igniter. Into the initiator ports are installed electric initiators that, in response to electrical energy supplied thereto, cause ignition of the pyrotechnic material contained in the igniter chamber. The burning pyrotechnics are, then, directed to the propellant fuel via the igniter output ports to cause the ignition of the missile motor. The pressure/gas generated from the combustion of the fuel ejects the igniter from the missile and propels the missile downrange.

Igniter 100 avoids the pre-ignition hazard by utilizing several retaining fingers (nozzle tabs) 303 that extend from the body of the igniter to secure the igniter inside the missile. These fingers are flexible and are recessed into retaining finger cavities 305 while the igniter passes through the nozzle of the missile during installation of the igniter. However, once installed in the nozzle throat, the fingers snap out of the cavities. No separate effort is required to secure the tabs into position in the nozzle throat, thereby avoiding frictions or electrostatic charges that may trigger pre-mature ignition of the motor. These retaining fingers hold the igniter securely in place inside the missile during all aspects of its non-operational life as well as holding the igniter in place momentarily during motor ignition, allowing rapid pressure build-up in the missile motor.

Direct stereolithographic fabrication, without the use of intermediate non-operational prototype, of functional missile parts as described above enables rapid modification of designs, very fast design-to-manufacture timelines and economy of production. Because of the limitations of conventional machining or casting techniques, some missile parts can be produced only by direct stereolithographic production.

Although a particular embodiment and form of this invention has been illustrated, it is apparent that various modifications and embodiments of the invention may be made by those skilled in the art without departing from the scope and spirit of the foregoing disclosure. An example is O-ring groove 307 on the outer surface of the igniter body that allows O-ring seals to be installed therein to provide an environmental seal. This seal protects the interior of the missile from exterior contaminants. Accordingly, the scope of the invention should be limited only by the claims appended hereto.

We claim:

1. An igniter for igniting a missile, the missile having a nozzle and a motor, said igniter being ejectably securable within the nozzle and comprising: a unitary, single-piece body having a first end and a second end, said ends being opposite from each other; a chamber within said body for holding therein pyrotechnic material; at least one initiator port on said first end and at least one output port on said second end, said ports communicating with said chamber; an initiator coupled to said initiator port, said initiator responding to electric current applied thereto to ignite said pyrotechnic material and producing pyrotechnic output, said output port passing therethrough said pyrotechnic output to ignite the motor; a plurality of flexible retaining fingers extending from said unitary body; and a plurality of cavities located on said body to allow said retaining fingers to recede thereinto while said igniter is being ejectably installed in said missile, said retaining fingers snapping out of said cavities to secure said igniter in place upon completion of installation.

2. An igniter as set forth in claim 1, wherein said igniter still further comprises a means for protecting said motor from external environment prior to ignition.

* * * * *